United States Patent
Hermansen

(10) Patent No.: US 7,572,472 B2
(45) Date of Patent: Aug. 11, 2009

(54) METHOD AND SYSTEM FOR CREATION OF COMPRESSION MOLDED EDIBLE ICE OBJECTS

(75) Inventor: Carsten Hermansen, Aarhus V (DK)

(73) Assignee: Tetra Laval Holding & Finance S.A., Pully (CH)

( * ) Notice: Subject to any disclaimer, the term of this patent is extended or adjusted under 35 U.S.C. 154(b) by 673 days.

(21) Appl. No.: 10/515,850

(22) PCT Filed: May 26, 2003

(86) PCT No.: PCT/DK03/00348

§ 371 (c)(1), (2), (4) Date: Nov. 29, 2004

(87) PCT Pub. No.: WO03/099033

PCT Pub. Date: Dec. 4, 2003

(65) Prior Publication Data

US 2006/0034990 A1    Feb. 16, 2006

(30) Foreign Application Priority Data

May 27, 2002    (DK) ............................... 2002 00814

(51) Int. Cl.
    *A23G 9/04* (2006.01)
(52) U.S. Cl. .......... 426/389; 426/515; 426/524
(58) Field of Classification Search ......... 426/100–101, 426/565, 389, 512, 515, 524; 425/256–261; 62/1, 340, 345, 348; 222/1, 146.6, 167–172
    See application file for complete search history.

(56) References Cited

U.S. PATENT DOCUMENTS

| | | | | |
|---|---|---|---|---|
| 2,665,648 A | * | 1/1954 | Vogt | 425/377 |
| 2,850,990 A | * | 9/1958 | Rasmusson | 222/135 |
| 2,892,423 A | * | 6/1959 | Glass | 425/126.2 |
| 3,179,041 A | * | 4/1965 | Luthi et al. | 100/223 |
| 3,468,265 A | * | 9/1969 | Otken | 425/130 |
| 3,476,037 A | * | 11/1969 | Gorby | 100/223 |
| 3,621,795 A | * | 11/1971 | Lonz et al. | 425/112 |
| 3,777,504 A | * | 12/1973 | Marchi | 62/73 |
| 3,982,035 A | * | 9/1976 | Orlowski | 426/454 |
| 3,996,760 A | * | 12/1976 | Bair, Jr. | 62/73 |
| 4,012,185 A | | 3/1977 | Poore et al. | |
| 4,153,404 A | | 5/1979 | Ottman | |
| 4,413,461 A | * | 11/1983 | Waldstrom | 53/122 |

(Continued)

FOREIGN PATENT DOCUMENTS

EP    0 201 141 A2    12/1986

*Primary Examiner*—Drew E Becker
(74) *Attorney, Agent, or Firm*—David S. Safran; Roberts Mlotkowski Safran & Cole, P.C.

(57) ABSTRACT

A method and system for creation of compression-molded edible ice objects from a pulverized ice mass, where said method involves feeding of the pulverized ice mass from a container to one or more cylinders in an inlet magazine and movement of the one or more cylinders of the inlet magazine to a transfer position. Furthermore, the method also comprises transferring of the ice mass from the one or more cylinders to at least one form in a form unit by compression to form one or more edible ice objects, and movement of the at least one form to a release position, where the edible ice objects are released from the at least one form.

9 Claims, 4 Drawing Sheets

U.S. PATENT DOCUMENTS

| | | | |
|---|---|---|---|
| 4,417,610 A * | 11/1983 | Waldstrom et al. | 141/91 |
| 4,548,573 A | 10/1985 | Waldström | |
| 4,611,468 A * | 9/1986 | Degn | 62/71 |
| 4,761,128 A * | 8/1988 | Fowler et al. | 425/126.2 |
| 4,986,080 A * | 1/1991 | Grigoli et al. | 62/75 |
| 5,242,291 A * | 9/1993 | Farmakis | 425/215 |
| 5,401,156 A * | 3/1995 | Anderson | 425/147 |
| 5,435,143 A * | 7/1995 | Heinrich | 62/75 |
| 5,447,036 A * | 9/1995 | Heinrich | 62/75 |
| 5,718,354 A * | 2/1998 | Binley | 222/1 |
| 5,738,895 A * | 4/1998 | Fuchs et al. | 426/515 |
| 7,052,728 B2 * | 5/2006 | Kateman et al. | 426/515 |
| 2002/0018833 A1 * | 2/2002 | Cathenaut et al. | 426/512 |

* cited by examiner

METHOD AND SYSTEM FOR CREATION OF COMPRESSION MOLDED EDIBLE ICE OBJECTS

BACKGROUND OF THE INVENTION

1. Field of Invention

The present invention relates to a method and a system for creation of compression molded edible ice objects from a pulverized ice mass or a pulverized combination of ice mass and one or more other temperature-dependent products.

2. Description of the Related Art

The traditional method of creating edible ice objects is characterized by the use of ice mass of more or less liquid consistency. The ice mass is poured into a form and is exposed to severe cold whereby the ice mass freezes to an edible ice object which is released from the form.

However, the traditional method has the disadvantage that the ice mass needs a relatively high temperature to keep the right consistency until it is poured into the form.

Therefore, it is not possible to have a low temperature around the known systems, as the ice mass must be kept relatively warm.

There is a general problem as the supply of a certain amount of focused cold fluid is required after the ice mass has entered the form.

Furthermore, there is a problem in connection with ice mass that cannot endure temperatures above a certain limit without wholly or partly losing its characteristics. An example is the use of ice mass mixed with carbon dioxide where the carbon dioxide only remains in the ice mass insofar as the temperature is kept somewhat below freezing point. If the temperature becomes too high, the carbon dioxide is released from the ice mass immediately by converting into free gas and the process cannot be stopped when first initiated.

SUMMARY OF THE INVENTION

The object of the invention is to provide a method and a system that allows creation of edible ice objects at very low temperatures and without using liquid ice mass.

Among other things the present invention relates to a method comprising the following steps:
- feeding of pulverized ice mass or a pulverized combination of ice mass and one or more other temperature-dependent products from a container to one or more cylinders in an inlet magazine,
- moving said one or more cylinders of said inlet magazine to a transfer position,
- transferring said pulverized ice mass or a pulverized combination of ice mass and one or more other temperature-dependent products from said one or more cylinders to at least one form in a form unit by means of compression means to form one or more edible ice objects, and
- moving said at least one form to a release position where said edible ice objects are released from said at least one form.

Hereby, it is possible to create a method for creation of compression-molded edible ice objects from a pulverized ice mass. The method allows the use of very low temperatures without affecting the functionality of the method and thereby the ice mass' transfer into a form.

This gives further possibility for reducing or completely excluding a subsequent cooling before the product, in the form of edible ice objects, is brought to a cold storage unit.

It shall be emphasized that the term "pulverized" should be understood as reducing an ice mass to smaller bits of ice, e.g., a powder of bits of ice. The size of the ice bits may be of any size that allows the ice mass to be formed to ice objects without having a liquid consistency.

It shall further be emphasized that the term "movement" indicates a movement of "said one or more cylinders" and/or "said at least one form" internally or externally. An example of an internal movement may be the movement of a piston in a cylinder allowing the transfer of the product to a form without external movements between the cylinder and the form. Combinations are also possible, e.g., external movements combined with internal pistons in the cylinders and/or the forms.

In a further aspect of the invention, the method is characterized by a surrounding temperature below 0 degrees Celsius and preferably below minus 10 degrees Celsius such as approximately minus 20 degrees Celsius. Thereby, it is possible to keep the pulverized ice mass or a pulverized combination of ice mass and one or more other temperature-dependent products in a stable condition or in a form to be used in the process of compression molding an edible ice object.

In a further aspect of the invention, said inlet magazine and said form unit make rotating movements in relation to one another where inlet magazine and form unit during rotation wholly or partly overlap one another.

In a further aspect of the invention, said compression means first make a transfer and subsequently a compression of the ice mass or the pulverized combination of ice mass and one or more other temperature-dependent products.

In a further aspect of the invention, the position and function of the form is controlled by the form's control elements that follow a pre-established curve in a fixed part, which is secured in relation to the rotating inlet magazine and form unit.

In a further aspect of the invention the form and its control elements make an up/down movement by following the pre-established curve.

In an even further aspect of the invention, said form opening at the up movement and closing at the down movement.

The present invention also relates to a system comprising:
- a container to hold said pulverized ice mass or said pulverized combination of ice mass and one or more other temperature-dependent products,
- an inlet magazine with one or more cylinders for reception of said pulverized ice mass or said pulverized combination of ice mass and one or more other temperature-dependent products from said container,
- a form unit comprising at least one form, and
- compression means for transfer of said pulverized ice mass or said pulverized combination of ice mass and one or more other temperature-dependent products from said one or more cylinders to said at least one form in the form unit.

Hereby, it becomes possible to create a system that can be operated in very low temperatures, e.g., by placing the system in a room with a constantly very low temperature.

Furthermore, said system makes it possible to create a compact system with a high efficiency. Among other things this is caused by the fact that only very little time is needed for cooling the ice mass after it has entered the form.

In a further aspect of the invention, the inlet magazine and the form unit have driving means to secure the rotating movements are performed.

In a further aspect of the invention, the inlet magazine and the form unit being placed so that they wholly or partly overlap one another, e.g., at the top or bottom, respectively.

In a further aspect of the invention, at least one form for said pulverized ice mass or said pulverized combination of ice mass and one or more other temperature-dependent products can be separated in form parts such as form halves or is provided with openings allowing removal of the edible ice objects without being separated.

In a further aspect of the invention, said form parts are provided with control elements moving in a pre-established curve.

In an aspect of the invention, said control elements performing an up/down movement by following said pre-established curve.

In a further aspect of the invention, said at least one form being able to open at up movement and close at down movement of said control elements.

In an even further aspect of the invention, said pulverized ice mass contains a frozen ice product, such as fruit juice, ice mix, ice cream that may be mixed with one or more other temperature-dependent products like, e.g., $CO_2$ hydrate/carbon hydrate, chocolate or caramel.

In a further aspect of the invention, the compression means are pistons compressing the ice mass or the pulverized combination of ice mass and one or more other temperature-dependent products from said one or more cylinders to said at least one form in the form unit.

In a further aspect of the invention, the number of cylinders in the inlet magazine and forms in the form unit is between 20 and 50 and preferably between 20 and 30. Hereby, it is possible with the many cylinders and forms to achieve a calm movement in connection with the edible ice production. The number of "active" pistons may advantageously be chosen high to achieve high production quantities, such as five pistons compressing ice mass into forms.

In a further aspect of the invention, one or more fixed closing plates closing one or more cylinders in said inlet magazine at the bottom of said cylinders.

In an even further aspect of the invention, said one or more of fixed closing plates being a fixed plate in relation to said moving inlet magazine.

The invention will now be described in detail with reference to the accompanying drawings.

DETAILED DESCRIPTION OF THE INVENTION

Figure 1:
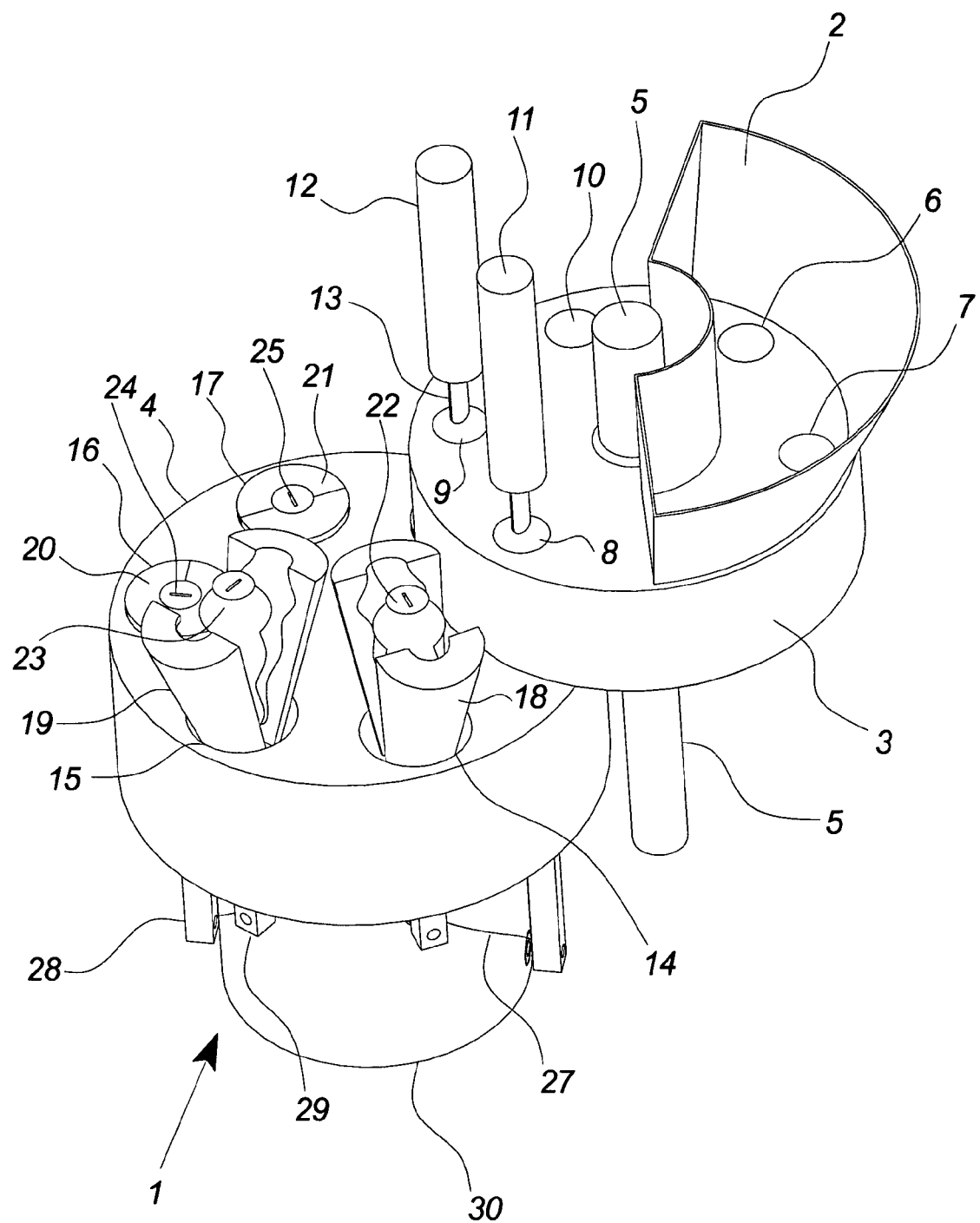
FIG. 1 illustrates in perspective a system for creation of compression molded edible ice objects according to the invention.

FIG. 1 illustrates in perspective a system 1 for creation of compression molded edible ice objects 22-25 according to the invention.

The system 1 comprises a container 2, where the container defines a bounded room for a pulverized ice mass. The bottom of the container is formed by the upper side or surface of an inlet magazine 3 while the container has side walls that form a bowl form for said ice mass. The container has an arcuate shape that covers more than half of the upper side of the inlet magazine 3.

The pulverized ice mass may, e.g., be frozen juice, such as frozen fruit juice, a frozen ice mix or ice cream which is pulverized by crushing or by other means pulverized into an ice powder.

In a preferred embodiment of the invention, said pulverized ice mass is mixed with one or more other temperature-dependent products such as $CO_2$ hydrate/carbon hydrate (carbon dioxide attached to water molecules), chocolate or caramel, wherein the mixture requires a low temperature to stay stable or applicable in the process.

The inlet magazine 3 is formed like a circular cylindrical unit with six inner cylinders stretching from the upper side to the lower side of the inlet magazine 3. The inlet magazine 3 has six openings into said cylinders, only five of the six openings 6-10 being visible in the figure.

Furthermore, the inlet magazine 3 is provided with a shaft 5 stretching through the magazine along a center line of the magazine. The cylinders and the associated openings are placed symmetrically around the center line, so that the distance between the cylinders is the same.

The inlet magazine 3 can rotate around the centre line by turning the shaft 5, e.g., by using driving means. The driving means mainly comprises an electrical motor, e.g., with an associated end stop mechanism to secure that the rotating movement can be stopped at a given spot by using an index gear in connection with the electrical motor.

Above the inlet magazine 3 and next to the container 2, one or more pistons are placed, wherein the illustrated embodiment has a first and second piston 11, 12. The first and second pistons are displaced in relation to one another, wherein the distance corresponds to the distance between the two openings in the inlet magazine 3.

The pistons 11, 12 are provided with a form part 13 at the lower side. The form part 13 has a shape corresponding to a part of an ice cream stick.

The pistons 11, 12 and the container 2 are all secured in their positions and the inlet magazine 3 therefore makes rotating movements in relation to these.

Furthermore, the system 1 comprises a form unit 4 for the ice mass. The form unit is illustrated as a cylinder with a number of openings 14-17, wherein the illustrated preferred embodiment has six openings on the upper side of the form unit. The openings are placed symmetrically around a centre line of the form unit with the same intervals between the openings. The form parts 18-21 are placed in the openings, wherein each form part in the present embodiment of the invention forms a half of a form for ice mass. As illustrated in FIG. 1, the form parts of a form may be separated by raising it from the opening and closed by lowering it into the opening. When the form is aligned with the surface of the form unit, the form will be closed and the ice mass is shaped into an ice object. In closed condition, the form still has an opening for feeding of ice mass, whereas the bottom of the form is closed and thereby form a tightly closed form having the possibility of feeding ice mass from above.

Openings 14-17 stretch through the form unit and therefore corresponding openings (illustrated in FIG. 4) are placed on the lower side of the form unit 4. The openings on the lower side of the form unit are provided with the control element of the forms. A control element controls whether the form should be open by raising it out of the opening or closed by lowering it. The control element is shaped as a bar to which the form halves are mounted in a turnable arrangement. In an embodiment of the invention, the turnable arrangement comprises two shafts each gathering a form half by means of the bar (illustrated in FIGS. 2 and 3), whereby the form halves can turn away from one another when raised from the form unit.

The figures illustrate a lowered control element 28 and a raised control element 29 corresponding to an open and a closed form.

The bars are provided with ball bearings running on a track or in a curve 27, whereby the control element 28, 29 makes up/down movements following the track or curve.

The form unit 4 also comprises driving means to make the form unit execute rotating movements around the center line of the form unit. The driving means mainly comprises of an electrical motor, e.g., with an associated end stop mechanism to secure that the rotating movement can be stopped at a given spot by using an index gear in connection with the electrical motor.

The driving means and the end stops insure that the inlet magazine 3 and the form unit 4 run in intervals, each interval moving an opening in the inlet magazine 3 or the form unit 4 on to the next position, which was recently occupied by another opening. For a system with six openings in the inlet magazine 3 and the form unit 4 there will be 60 degree movements for each movement.

The driving means for the inlet magazine 3 and the form unit 4 may be the same unit driving both through one or more drives or power transmissions.

The inlet magazine 3 and the container 2 can advantageously be made of a plastic material or a metal such as steel.

The form unit 4 is mainly made of steel or another metal with similar characteristics.

However, it should be noted that there might be a random number of openings in the inlet magazine 3 and the form unit 4, such as between 20 and 50 or preferably between 20 and 30 depending on the application. In connection with each opening in the inlet magazine 3, a piston may be positioned, wherein each piston is activated when the associated opening is correctly placed in relation to the form unit 4. Thereby, there may be five random pistons out of 50 successively pressing the ice mass into the form unit 4.

In another embodiment of the invention, there is only one piston to make the compression process of the ice mass, where said piston first fills the form with ice mass and afterwards compresses the ice mass.

Figure 2:
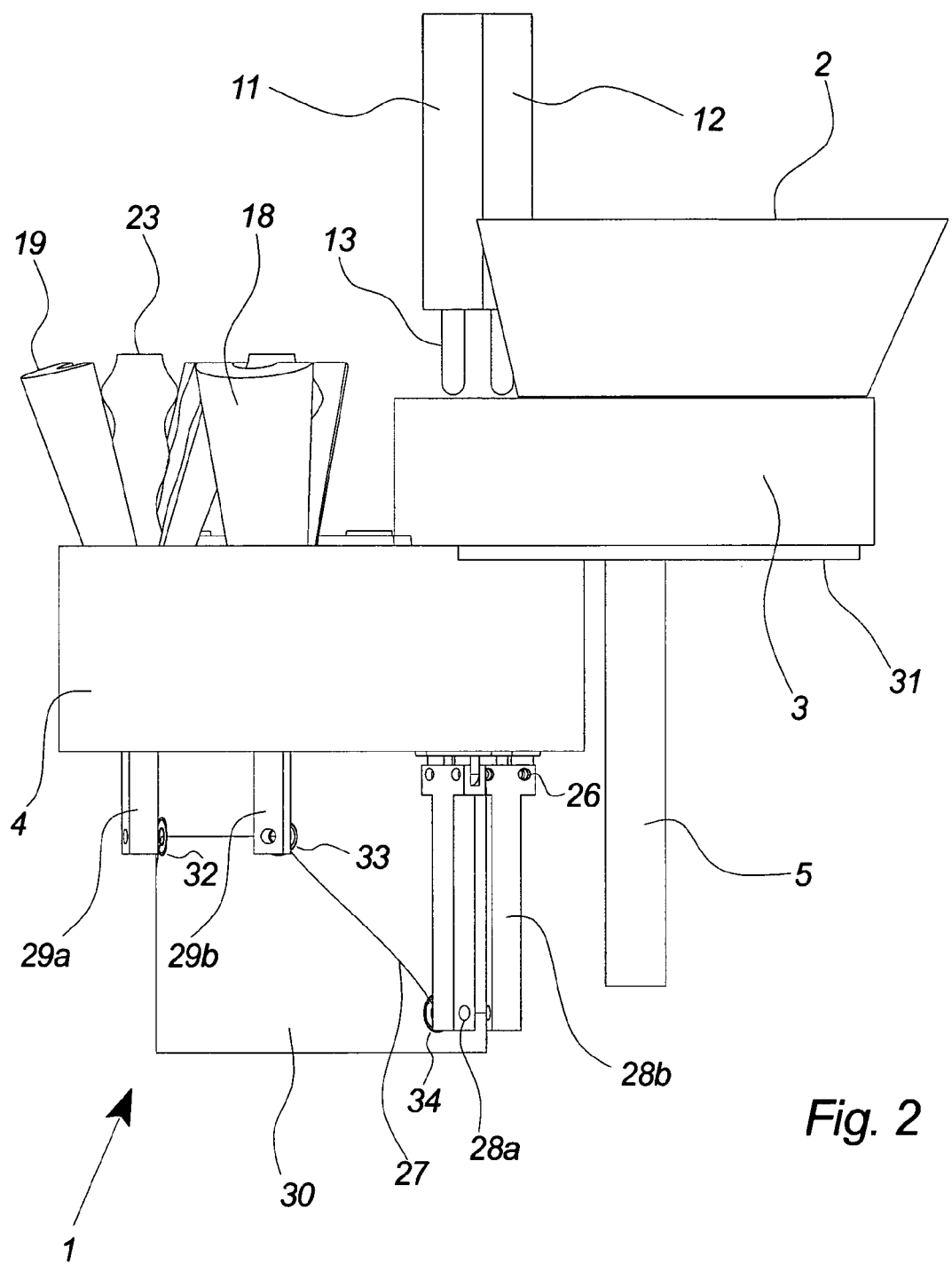
FIG. 2 illustrates the system as seen from the side from a first angle.
Figure 3:
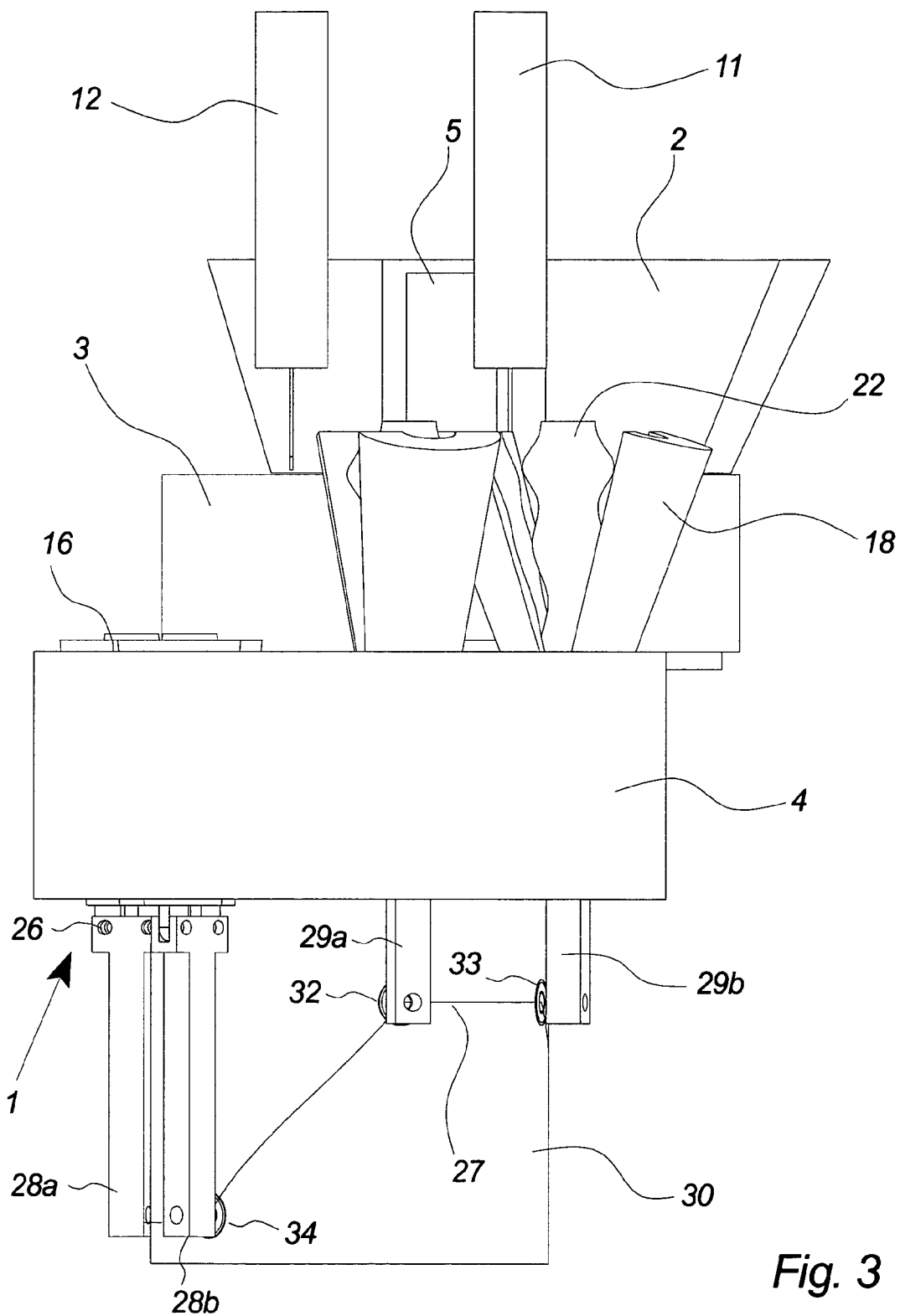
FIG. 3 illustrates the system as seen from the side from a second angle.

FIGS. 2 and 3 illustrate the system for creation of compression molded edible ice objects 22-25 according to the invention as seen from the first and second angle.

From the lowered bars 28a, 28b, it can be seen that the bars 28, 29 are connected to the form parts through shafts 26.

Furthermore, it shows that the ball bearings 32-34 are placed on the inside of the bars 28, 29 and follow a track or curve 27 in a fixed part 30 functioning as a predefined curve for the system. Thereby, it is possible for one bar to make a movement from which the bar and the associated form in certain positions are raised 29 by following a track 27 and in other positions 28 are lowered.

The fixed part 30 functioning as the system's curve will, like the container and the pistons, be secured while the inlet magazine 3 and the form unit 4 rotate in relation to these.

Openings and cylinders in the inlet magazine 3 which are inside the area defined by the container 2 are closed at the bottom by a closing plate 31. The closing plate, together with the container and the pistons, is secured in a way that enables the inlet magazine 3, as well as the form unit 4, to make rotating movements in relation thereto.

Figure 4:
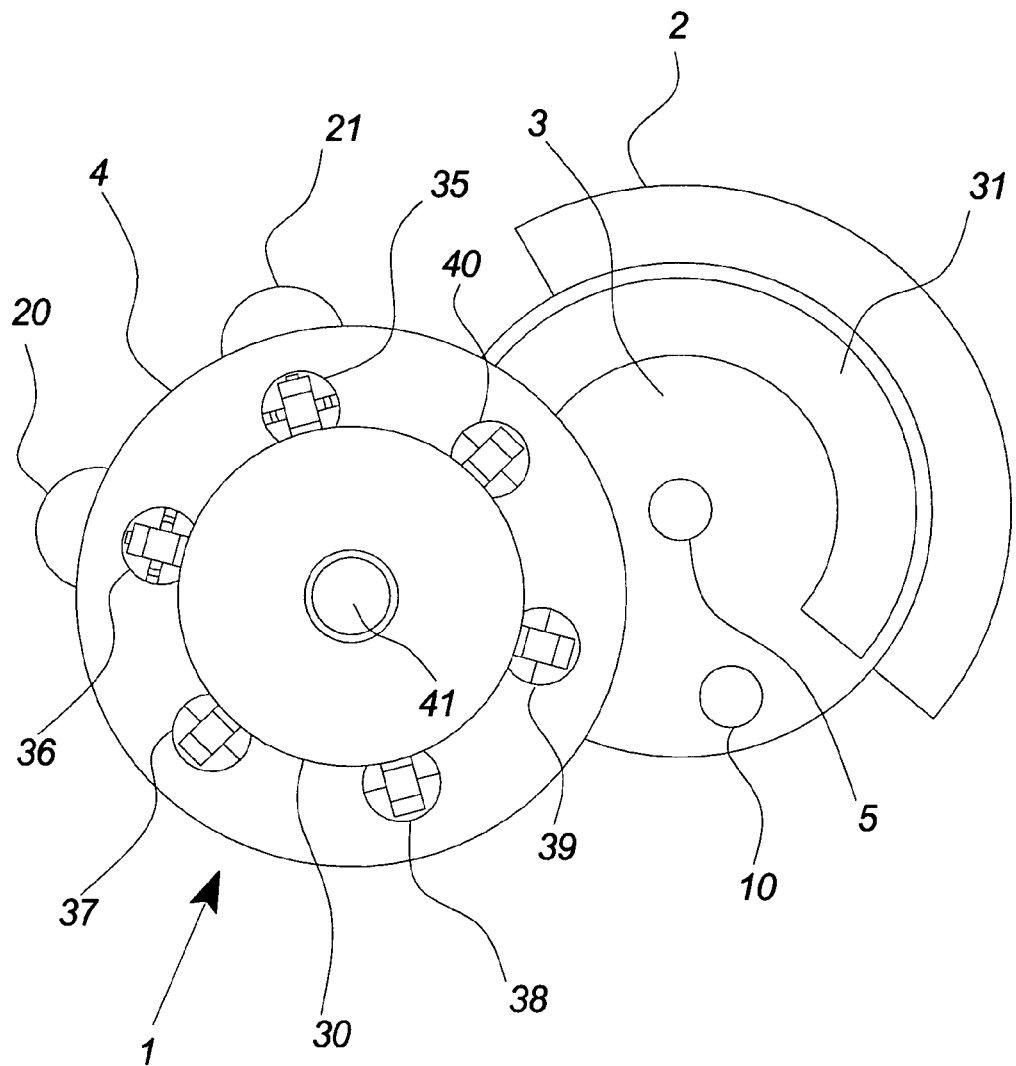
FIG. 4 illustrates the system as seen from below.

FIG. 4 illustrates the inlet magazine 3 and the form unit 4 as seen from below.

From below, there is a full view of the closing plate 31 from which it indirectly appears that three openings 6, 7 are covered by the closing plate and thereby close the cylinders at the bottom. The closing plate 31 stretches from the one side to the outer periphery of the form unit 4.

Furthermore, it also shows that the opening 10 is not blocked, and that the associated cylinder is open for through-flow, whereby the cylinder can be cleaned.

These two openings and the associated cylinders are positioned above the form unit 4.

Furthermore, it shows that the lower openings 35-40 of the form unit 4 are filled by the control elements 28, 29 and the form parts 18-21 as well as the shafts 26 and only the open form parts 20, 21 are visible.

The form unit 4 is also provided with a shaft 41 stretching along a center line of the form unit and is connected to a driving means for the form unit 4.

With reference to the figures, a preferred method to be used in connection with the above-mentioned system is explained:

The pulverized ice mass is fed into the container 2

The pulverized ice mass is distributed into the three cylinders in the inlet magazine with openings within the circumference of the container when, at the same time, the closing plate 31 is blocking the bottom of the cylinders The inlet magazine makes a rotating movement moving two new openings inside the circumference of the container, where they immediately are filled with pulverized ice mass.

Two full cylinders are moved to a position directly below the first and the second pistons and above two of the openings of the form unit, where the openings are facing two closed forms. In connection with the movement, the closing plate will block the ice mass to keep it from running out of the cylinders until the form unit blocks the cylinders.

The two pistons push and compress the ice mass in the cylinders down into the two closed forms in the form unit, where the ice mass by the final compression from the second piston is shaped into an ice object in the form.

Once more the inlet magazine makes rotating movements moving the first of the emptied cylinders to a cleaning position with free flow through the cylinder from the upper opening to the lower 10.

Afterwards, the inlet magazine 3 once more makes a rotating movement whereby the first cylinder moves inside the circumference of the container: Thereby the cylinder has completed the process from feeding, emptying and cleaning and continues to the next feeding.

The form unit 4 makes a corresponding rotation where at first one form is filled with ice mass and compressed. In connection with the compression, another form part 13 is compressed for the creation of an opening for an ice cream stick in the ice object.

Afterwards, the form is rotated to a position where the ice cream stick is inserted in the ice cream stick opening.

Afterwards, the form is rotated to a position where the ice object is released from the form by raising the form out of the form unit. When raising the form, the form parts are separated and fall apart where the form is raised when the control element follows a curve 27 created in a fixed unit 30.

In connection with the rotation of the form after releasing the ice object and the fall back into the form unit, said fall follows a falling course as prescribed by the curve 27.

Once more the form is ready for rotation underneath the inlet magazine and to be filled with ice mass.

This method is to take place at a temperature below 0 degrees Celsius and preferably below minus 10 degrees Celsius such as approximately minus 20 degrees Celsius. This is achieved by placing the system in a cold-storage room where the temperature can be lowered to said temperatures.

The invention has been exemplified above with reference to specific examples. However, it should be understood that the invention is not limited to the particular examples described above but may be used in connection with a wide variety of applications.

Further, it should be understood that especially the system for creation of compression-molded edible ice objects according to the invention may be designed in a multitude of varieties within the scope of the invention as specified in the apparatus claims. Even further, it should be understood that the method steps may be changed in a multitude of varieties within the scope of the invention as specified in the method claims.

The invention claimed is:

1. Method for creation of compression molded edible ice objects from a pulverized ice mass or a combination of pulverized ice mass and at least one other temperature-dependent product, said method comprising the following steps:
   feeding of pulverized ice mass or a combination of pulverized ice mass and at least one other temperature-dependent product from a container to at least one cylinder in an inlet magazine,
   moving said at least one cylinder of said inlet magazine to a transfer position,
   using a compression means for transferring said pulverized ice mass or a combination of pulverized ice mass and at least one other temperature-dependent product from said at least one cylinder into at least one form in a form unit and using said compression means for compressing said pulverized ice mass or a combination of pulverized ice mass and at least one other temperature-dependent product in the at least one form for forming at least one edible ice object in said at least one form, and
   moving said at least one form to a release position where said edible ice object is released from said at least one form,
   wherein said compression means comprise at least one piston.

2. Method according to claim 1, wherein said method is performed at a surrounding temperature below 0 degrees Celsius.

3. Method according to claim 1, wherein said method is performed at a surrounding temperature below minus 10 degrees Celsius.

4. Method according to claim 1, wherein said method is performed at a surrounding temperature of approximately minus 20 degrees Celsius.

5. Method according to claim 1, wherein said inlet magazine and said form unit are rotatable in relation to one another with the inlet magazine and form unit at least partly overlapping one another during a portion of rotation.

6. Method according to claim 1, wherein the position and function of the form is controlled by form control elements that follow a pre-established curve in a fixed part, which is secured in relation to the rotating inlet magazine and the form unit.

7. Method according to claim 6, wherein said form and form control elements make up and down movements following a pre-established curve.

8. Method according to claim 7, wherein said form opens during the up movement and closes during the down movement.

9. Method according to claim 1, wherein said at least one piston comprises at least two pistons, a first of which is used to push and compress the ice mass in the cylinder down into the form in the form unit, and the second of which is used to compress the ice mass into a shaped ice object in the form.

* * * * *